(12) United States Patent
Zhu

(10) Patent No.: US 11,973,741 B2
(45) Date of Patent: Apr. 30, 2024

(54) DATA LEAKAGE PREVENTION

(71) Applicant: New H3C Security Technologies Co., Ltd., Anhui (CN)

(72) Inventor: Xuepeng Zhu, Beijing (CN)

(73) Assignee: New H3C Security Technologies, Co., Ltd., Anhui (CN)

( * ) Notice: Subject to any disclaimer, the term of this patent is extended or adjusted under 35 U.S.C. 154(b) by 174 days.

(21) Appl. No.: 17/423,817

(22) PCT Filed: May 7, 2020

(86) PCT No.: PCT/CN2020/089040
§ 371 (c)(1),
(2) Date: Jul. 16, 2021

(87) PCT Pub. No.: WO2020/233412
PCT Pub. Date: Nov. 26, 2020

(65) Prior Publication Data
US 2022/0116363 A1 Apr. 14, 2022

(30) Foreign Application Priority Data
May 21, 2019 (CN) .......................... 201910426343.7

(51) Int. Cl.
*H04L 29/06* (2006.01)
*H04L 9/40* (2022.01)
*H04L 67/564* (2022.01)

(52) U.S. Cl.
CPC ........ *H04L 63/0281* (2013.01); *H04L 63/166* (2013.01); *H04L 63/20* (2013.01); *H04L 67/564* (2022.05); *H04L 2212/00* (2013.01)

(58) Field of Classification Search
CPC . H04L 63/0428; H04L 63/20; H04L 63/0281; H04L 63/166
See application file for complete search history.

(56) References Cited

U.S. PATENT DOCUMENTS

2010/0049978 A1* 2/2010 Ogawa ...................... H04L 9/00
713/170
2011/0173490 A1* 7/2011 Narayanaswamy ........................
H04L 63/1408
714/4.11
(Continued)

FOREIGN PATENT DOCUMENTS

CN          105678188 A     6/2016
CN          107592303 A     1/2018
(Continued)

*Primary Examiner* — Dao Q Ho
(74) *Attorney, Agent, or Firm* — McDonnell Boehnen Hulbert & Berghoff LLP

(57) ABSTRACT

A Data Leakage Prevention (DLP) device and a method for processing a packet are disclosed. The DLP device receives an IP packet sent by a user device, wherein the IP packet includes TCP port information; and detects whether a first TCP connection is established between the DLP device and the user device. If the first TCP connection is not established, when the IP packet is a data packet, an application layer protocol for transmitting the IP packet is determined by comparing a packet feature of the IP packet with packet features corresponding to respective application layer protocols. When the application layer protocol for transmitting the IP packet is listened to, a pair of TCP connections is established according to the TCP port information, wherein the pair of TCP connections includes the first TCP connection and a second TCP connection between the DLP device and a server.

11 Claims, 5 Drawing Sheets

(56) References Cited

U.S. PATENT DOCUMENTS

| | | | |
|---|---|---|---|
| 2012/0324526 A1* | 12/2012 | Meyer | H04L 63/20 |
| | | | 726/1 |
| 2014/0036674 A1 | 2/2014 | Agrawal | |
| 2015/0143504 A1* | 5/2015 | Desai | H04L 63/0245 |
| | | | 709/224 |
| 2016/0127317 A1 | 5/2016 | Ardeli | |
| 2016/0226918 A1 | 8/2016 | Readshaw et al. | |
| 2017/0041297 A1* | 2/2017 | Ling | H04L 63/126 |
| 2018/0288062 A1* | 10/2018 | Goyal | H04L 63/0281 |
| 2018/0309795 A1 | 10/2018 | Ithal | |
| 2018/0331946 A1* | 11/2018 | Olofsson | H04L 61/4511 |
| 2022/0116363 A1* | 4/2022 | Zhu | H04L 69/163 |

FOREIGN PATENT DOCUMENTS

| | | |
|---|---|---|
| JP | 2006135776 A | 5/2006 |
| JP | 2010200300 A | 9/2010 |
| JP | 2016082438 A | 5/2016 |
| WO | 2018/208552 A1 | 11/2018 |

\* cited by examiner

DATA LEAKAGE PREVENTION

CROSS-REFERENCE TO RELATED APPLICATIONS

The present application is a U.S. National Phase Application under 35 U.S.C. § 371 of International Application No. PCT/CN2020/089040 filed May 7, 2020, which claims priority to Chinese patent application No. 201910426343.7, filed with the China National Intellectual Property Administration on May 21, 2019 and entitled "Data Leakage Prevention Device and Method for Processing Packet", which are incorporated herein by reference in their entirety.

BACKGROUND

With the rapid development of information technology, Internet has become an indispensable means for working, communication, cooperation and interaction. The Internet, on one hand, improves people's work efficiency, security requirements are also proposed for information storage and access control of a computer. However, accidental or intentional operations of a staff in a company through the Internet may cause accidents such as data leakage or loss over Internet. In order to solve such problem, Data Leakage Prevention (referred to as "DLP") technologies are proposed.

At present, in security protection by using a DLP technology, a DLP device, as a proxy device, is connected between a user device and a server through a bridge. The DLP device listens to one or more specified Transmission Control Protocol (referred to as "TCP") ports. When receiving a handshake packet sent by the user device, the DLP device maps the handshake packet to a specified TCP port according to a preset firewall rule. The DLP device then establishes a TCP connection with the user device through a specified TCP port. Further, the DLP device establishes a TCP connection with the server through a specified TCP port.

Therefore, the DLP device establishes the TCP connections with the user device and the server through the specified TCP ports respectively, such that the user device and the server transmit packets to each other through the DLP device.

In the above process of data leakage prevention, the DLP device can listen to the specified TCP ports, and the implementation of the data leakage prevention depends on the bridge and the firewall rule provided by the operating system. If the bridge fails or even the kernel crashes, the TCP connection established between the DLP device and the user device and the TCP connection established between the DLP device and the server will be disconnected, and thus the user device cannot access the network.

DETAILED DESCRIPTION

The technical solutions of examples of the disclosure will be described clearly and completely below in combination with the drawings of the examples of the disclosure. Obviously, the examples described are only some of the examples of the disclosure instead of all of them. All other examples obtained by those of ordinary skills in the art based on the examples herein without any creative efforts are within the scope of the disclosure.

Figure 1:
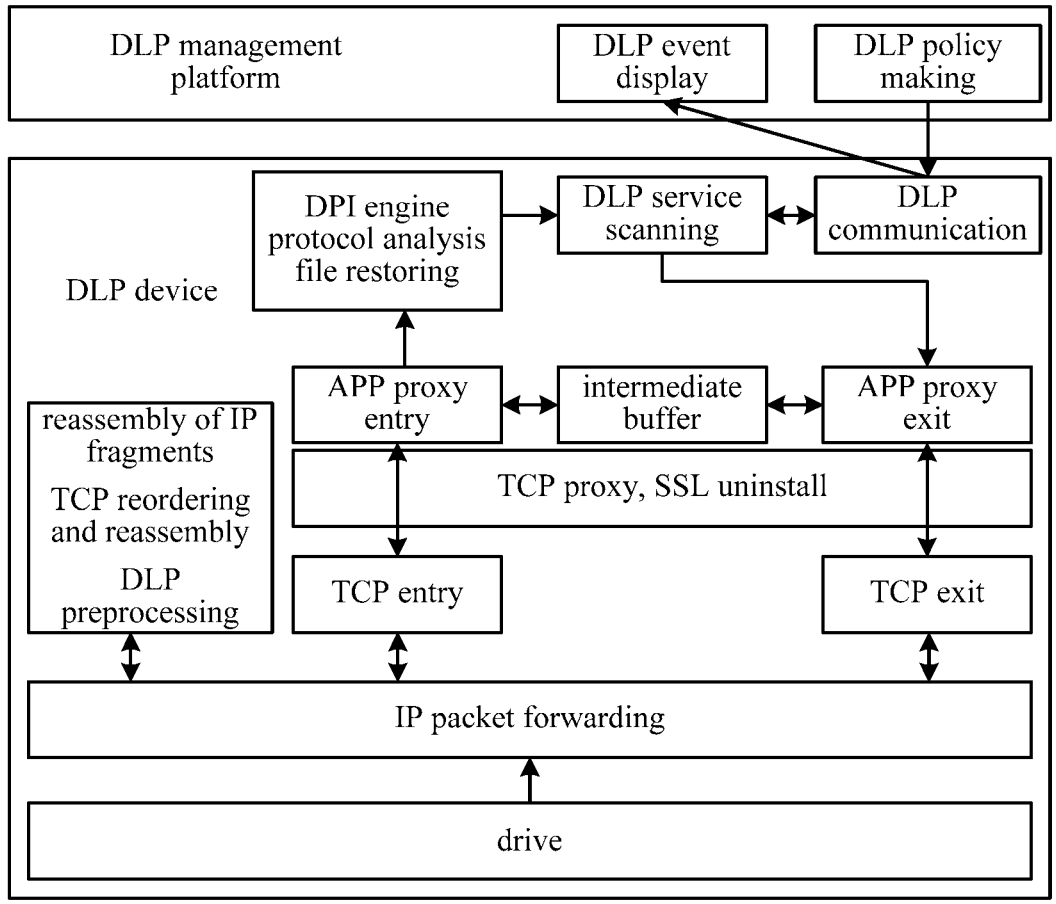
FIG. 1 is a schematic diagram of a DLP software architecture according to an example of the disclosure.

In order to allow a DLP device to listen to any TCP ports and to solve the problem that a user cannot access to the network due to bridge failures or even kernel crashes, a DLP device is provided by an example of the disclosure. FIG. 1 shows a DLP software architecture. The DLP software architecture includes a DLP management platform and a DLP device. The DLP management platform is to provide a user with a platform for managing and operating the DLP device.

Specifically, the DLP management platform includes a DLP event displaying module and a DLP policy making module.

The DLP event displaying module is to display DLP events sent by the DLP device. The DLP event is a result from the DLP device scanning DLP services. The result includes allowing a packet to pass, blocking a packet, and the like.

The DLP policy making module is to receive a security policy input by a user and send the security policy to the DLP device.

The DLP device includes a driving module, an Internet Protocol (referred to as "IP") packet forwarding module, a DLP preprocessing module, an application (referred to as "APP") proxy entry, an APP proxy exit, a TCP proxy and Secure Sockets Layer (referred to as "SSL") uninstalling module, a deep packet inspection (referred to as "DPI") engine, a DLP service scanning module and a DLP communication module, etc.

The driving module is to map an IP packet received by a network card to a user-mode buffer.

The IP packet forwarding module is to forward an IP packet. The IP packet forwarding module can implement the complete forwarding function of the DLP device for forwarding IP packets.

The DLP preprocessing module is to perform operations of preprocessing a packet, such as reassembly of IP packet fragments, and reassembly of TCP packet fragments.

The TCP proxy and SSL uninstalling module is to manage a TCP user-mode protocol stack and an open secure sockets layer (referred to as "OpenSSL") cryptogram library.

An intermediate buffer is to buffer data generated by the DLP device during the processing of IP packets.

A TCP entry is to, when the DLP device receives an IP packet, provide the APP proxy entry with a struct corresponding to the IP packet, wherein the IP packet contains TCP port information of the TCP entry.

A TCP exit is to, when the DLP device sends an IP packet, provide the APP proxy exit with the TCP port information of the TCP entry.

The APP proxy entry is to call the TCP user-mode protocol stack to establish the TCP entry and the TCP exit; receive the struct corresponding to the IP packet sent by the IP packet forwarding module to the APP proxy entry through the TCP entry; call the OpenSSL cryptogram library to decrypt user data included in the IP packet, and buffer the user data obtained from the decryption into the intermediate buffer; and send the struct to the DPI engine.

The DPI engine is to receive the struct sent by the APP proxy entry, perform protocol analysis on the IP packet to determine an application layer protocol for transmitting the IP packet, and restore the user data contained in the IP packet.

The DLP service scanning module is to receive a scan message sent by the DPI engine and scan DLP services. Specifically, a target matching item that matches with the user data is searched in the security policy; and a corresponding message is sent to the APP proxy exit according to an action item corresponding to the target matching item.

The APP proxy exit is to receive the message sent by the DLP service scanning module, call the TCP exit to instruct the IP packet forwarding module to forward the packet or to release the buffered IP packet.

The DLP communication module is to acquire a result obtained from the DLP service scanning module scanning the DLP services; send the result to the DLP management platform; and receive the security policy sent by the DLP management platform.

In the example of the disclosure, when the DLP device determines that the application layer protocol for transmitting the IP packet is listened to, based on the TCP port information contained in the IP packet, the first TCP connection between the DLP device and the user device is established, and the second TCP connection between the DLP device and the server is established. The data leakage prevention for the user device is then implemented based on the first TCP connection and the second TCP connection.

It can be seen that in the process of implementing the data leakage prevention, the DLP device can listen to any TCP ports. In addition, the DLP device does not need to set additional bridges and firewall rules, and solves the problem that a user cannot access to the network due to bridge failures or even kernel crashes.

The DLP device according to the example of the disclosure will be described in detail below through specific examples.

Figure 2:
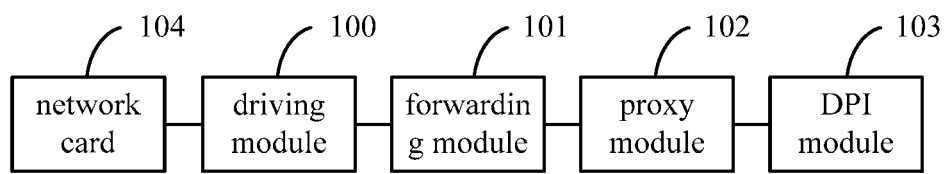
FIG. 2 is a schematic structural diagram of a DLP device according to an example of the disclosure.

Referring to FIG. 2, FIG. 2 is a schematic diagram of a DLP device according to an example of the disclosure. The DLP device includes a network card 104, a driving module 100, a forwarding module 101, a proxy module 102, and a DPI module 103. The driving module 100, the forwarding module 101, the proxy module 102 and the DPI module 103 may be software modules, i.e., modules implemented by executing a software program by a Central Processing Unit (referred to as "CPU"). The forwarding module 101 is the IP packet forwarding module shown in FIG. 1. The proxy module 102 includes the APP proxy exit and the APP proxy entry shown in FIG. 1. The DPI module 103 includes the DPI engine and the DLP service scanning module shown in FIG. 1.

The network card 104 is to receive an IP packet sent by a user device and send the IP packet to the driving module 100. The IP packet contains information such as an IP header and a TCP header, wherein the TCP header includes TCP port information. The IP packet may be a protocol packet or a data packet.

The driving module 100 is to receive the IP packet and buffer the IP packet into a user-mode buffer.

In the example of the disclosure, a buffer includes a kernel-mode buffer and a user-mode buffer. The rate at which the DLP device buffers data into the kernel-mode buffer is higher than the rate at which the DLP device buffers data into the user-mode buffer. Upper layer applications can directly access the data stored in the user-mode buffer, but cannot directly access the data stored in the kernel-mode buffer.

In an example, after receiving an IP packet, the driving module 100 may first store the IP packet into the kernel-mode buffer. After that, the driving module 100 copies the IP packet from the kernel-mode buffer to the user-mode buffer.

In another example, after receiving an IP packet, the driving module 100 may first store the IP packet into the user-mode buffer. In this way, the driving module 100 does not need to copy the IP packet from the kernel-mode buffer to the user-mode buffer, which improves the efficiency of packet processing.

In an example, the driving module 100 may use a zero-copy technology driving module provided by the CPU, such as the Data Plane Development Kit (referred to as "DPDK") driving module, which allows to directly buffer a received IP packet into the user-mode buffer skipping over the kernel-mode buffer.

The forwarding module 101 is to read the IP packet from the user-mode buffer, generate a struct corresponding to the IP packet, and send the struct to the proxy module 102.

In the example of the disclosure, the forwarding module 101 is to implement the forwarding of IP packets, and call an upper-layer service port to process the IP packets at each stage of the forwarding.

Specifically, the forwarding module 101 may read the IP packet from the user-mode buffer, analyze the IP packet, and generate a struct corresponding to the IP packet. The struct for the IP packet may include IP header information and TCP header information of the IP packet, and a storage location of the IP packet, and the like. The forwarding module 101 sends the struct corresponding to the IP packet to the proxy module 102.

The proxy module 102 is to receive the struct corresponding to the IP packet sent by the forwarding module 101; obtain the TCP port information according to the struct corresponding to the IP packet; and detect whether a first TCP connection is established between the DLP device and the user device according to the TCP port information; and if the first TCP connection is not established and when the IP packet is the data packet, send the struct corresponding to the IP packet to the DPI module 103.

After receiving the struct sent by the forwarding module 101, the proxy module 102 may obtain the TCP port information from the struct. It may also determine the storage location of the IP packet based on the struct, find the IP packet based on the storage location, and extract the TCP port information from the IP packet. The proxy module 102 detects, according to the TCP port information, whether the first TCP connection is established between the DLP device and the user device.

In an optional example, the DLP device may set a TCP connection list. The TCP connection list includes: TCP port information of TCP connections established between the DLP device and the user device. Based on this, the proxy module 102 detecting whether the first TCP connection is established between the DLP device and the user device according to the TCP port information may be implemented in the following manner.

Specifically, the proxy module 102 detects whether a TCP connection list includes the obtained TCP port information. If so, the proxy module 102 determines that the first TCP connection is established between the DLP device and the user device. If not, the proxy module 102 determines that the first TCP connection is not established between the DLP device and the user device.

If the first TCP connection has been established, the proxy module 102 sends the struct corresponding to the IP packet to the DPI module 103. The DPI module 103 performs protocol identification on the IP packet according to the struct corresponding to the IP packet.

If the first TCP connection is not established, the proxy module 102 detects the type of the IP packet, that is, detects whether the IP packet is a protocol packet or a data packet. In an example of the disclosure, the protocol packet may specifically be a handshake packet, which is a packet used to establish a TCP connection between devices. The following examples will be described by taking the protocol packet as a handshake packet.

If the proxy module 102 detects that the IP packet is a data packet, the proxy module 102 sends the struct corresponding to the IP packet to the DPI module 103.

The DPI module 103 is to receive the struct corresponding to the IP packet sent by the proxy module 102; obtain a packet feature of the IP packet according to the struct corresponding to the IP packet; determine an application layer protocol for transmitting the IP packet by comparing the packet feature of the IP packet with packet features corresponding to respective application layer protocols; and send a first message to the proxy module 102 when the application layer protocol for transmitting the IP packet is listened to.

The first message indicates that the application layer protocol for transmitting the IP packet is listened to. The packet feature of the IP packet may include: 5-tuple information of the IP packet, the length of the packet, keywords, and the like.

The DPI module 103 performs protocol identification on the IP packet after receiving the struct corresponding to the IP packet. Specifically, the DPI module 103 determines the storage location of the IP packet according to the struct corresponding to the IP packet; finds the IP packet according to the storage location, and obtains the packet feature of the IP packet; and determines the application layer protocol for transmitting the IP packet by comparing the packet feature of the IP packet with the packet features corresponding to the respective application layer protocols.

In an example of the disclosure, the DLP device has been configured with the packet features corresponding to the respective application layer protocols in advance. For example, the application layer protocols include protocol 1 and protocol 2. The packet features corresponding to the application layer protocols configured on the DLP device include: the packet feature corresponding to protocol 1 which is x and xx, and the packet feature corresponding to protocol 2 which is y and yy. If the DPI module 103 obtains an IP packet with the packet feature of x and xx, it determines that the packet feature of the IP packet matches with the packet feature corresponding to protocol 1, and thus protocol 1 is the application layer protocol for transmitting the IP packet.

After the application layer protocol for transmitting the IP packet is determined, the DPI module 103 detects whether the application layer protocol for transmitting the IP packet is a preset application layer protocol that is listened to. If so, the DPI module 103 sends the first message to the proxy module 102.

As a non-restrictive example, the first message may be a value as returned by a function. The value is specifically a result of negotiated by the DPI module 103 and the proxy module 102 in advance. For example, the value may be "0" that indicates being listened to, or "1" that indicates not being listened to. If the DPI module 103 determines that the application layer protocol for transmitting the IP packet is listened to, it sends a value of 0 to the proxy module 102.

The above function may be, but not limited to, a function of Fun ( ) get ( ) or the like. In an example of the disclosure, for illustration purpose, 0 is used to indicate being listened to, and 1 is used to indicate not being listened to, which is not limited. For example, it is also possible to use "3" to indicate being listened to and "4" to indicate not being listened to.

The proxy module 102 is further to establish a pair of TCP connections according to the TCP port information of the IP packet after receiving the first message. The pair of TCP connections includes the first TCP connection and the second TCP connection between the DLP device and the server.

After the first message is received and the application layer protocol for transmitting the IP packet is determined as being listened to, the proxy module 102 establishes the first TCP connection with the user device and establishes the second TCP connection with the server according to the TCP port information of the IP packet by using a TCP user-mode protocol stack.

It can be appreciated that the TCP port information used to establish the first TCP connection is the same as the TCP port information contained in the IP packet. Similarly, the TCP port information used to establish the second TCP connection is also the same as the TCP port information contained in the IP packet. Even if the TCP connection between the user device and the server is divided into the first TCP connection and the second TCP connection by the DLP device, that is, the TCP connection between the user device and the server is interrupted by the DLP device, information such as TCP port information contained in IP packets sent by the user device will not be changed, which reduces the risk that the server finds that IP packets are under proxy.

In the example of the disclosure, for TCP connections established by the DLP device, such as the first TCP connection and the second TCP connection, the DLP device can listen to TCP ports used to establish these TCP connections. Based on this, in the data leakage prevention, the DLP device can listen to any TCP ports instead of listening to a specified TCP port or ports.

Optionally, in an example of the disclosure, in the process of detecting the type of the IP packet, if the IP packet is determined to be a protocol packet (such as a handshake packet), the proxy module 102 sends a second message to the forwarding module 101.

The second message indicates that the IP packet is a protocol packet.

After receiving the second message, the forwarding module 101 determines that the IP packet is a protocol packet according to the second message. The forwarding module 101 reads the IP packet from the user-mode buffer, and sends the IP packet to the server. The server establishes a TCP connection with the user device according to the IP packet. In this way, the number of packets processed by the DLP device is reduced, and thus the burden on the DLP device is reduced. In addition, the user device establishes the TCP connection directly with the server, which reduces the risk that the server finds that IP packets are under proxy.

As a non-restrictive example, the second message may be a value as returned by a function. The value is specifically a result negotiated by the proxy module 102 and the forwarding module 101 in advance. For example, the value may be "0" indicating that the IP packet is a protocol packet, or "1" indicating that the IP packet is a data packet. If the DPI module 103 detects that the IP packet is the protocol packet, it sends a function value 0 to the proxy module 102. If the DPI module 103 detects that the IP packet is the data packet, it sends a function value 1 to the proxy module 102.

The function may be, but not limited to, a function of Fun ( ) get ( ) function, or the like. In an example of the disclosure, for illustration purpose, 0 is used to indicate that the IP packet is a protocol packet, and 1 is used to indicate that the IP packet is a data packet, which is not limited. For example, it is also possible to use "3" to indicate that the IP packet is a protocol packet, and "4" to indicate that the IP packet is a data packet.

Optionally, in an example of the disclosure, the DPI module 103 is further to perform deep packet inspection, thereby implementing the data leakage prevention.

Specifically, the IP packet further contains first user data. First, when the DPI module 103 determines that the application layer protocol for transmitting the IP packet is listened to, the DPI module 103 marks the location of the first user data. That is, the DPI module 103 marks the specific bytes where the first user data is located in the IP packet.

Then, the DPI module 103 decapsulates the IP packet to obtain an inner packet with the header of the encapsulation removed. The DPI module 103 obtains and buffers the first user data corresponding to the marked location. The first user data corresponding to the marked location is user data at the marked location of in the IP packet.

Finally, the DPI module 103 obtains a preset security policy, and the security policy includes matching items and action items. The DPI module 103 searches for a target matching item that matches with the first user data in the security policy, and performs an action indicated by an action item corresponding to the target matching item.

Optionally, in an example of the disclosure, the DPI module 103 is further to determine whether user data belonging to a same original data is received, thereby implementing accurate deep packet detection for the original data.

Specifically, the DPI module 103 determines whether all user data belonging to the same original data is received. If all user data belonging to the same original data has been received, that is, the original data is restored, the DPI module 103 obtains the preset security policy, and searches for the target matching item that matches with the user data in the security policy. If all user data belonging to the same original data has not been received, the DPI module 103 repeatedly performs the process of determining whether all user data belonging to the same original data is received.

It can be appreciated that a sender puts original data to be transmitted into an application layer packet for transmission. When the length (or the number of bytes) of the original data to be transmitted is large, the sender needs to divide the application layer packet into segments. That is, the sender divides the application layer packet into multiple IP packages for transmission. Such an IP package is an IP packet. After receiving all IP packets of the application layer packet, a receiver restores the original data to be transmitted. The application layer packet includes a Hyper Text Transport Protocol (referred to as "HTTP") packet, a Simple Mail Transfer Protocol (referred to as "SMTP") packet, a File Transfer Protocol (referred to as "FTP") packet, and the like.

In an example, the DPI module 103 may determine whether all user data belonging to the same original data is received in the following manner.

Specifically, in the case that an application layer packet is divided into multiple IP packets, the first IP packet carries a start marker of the application layer packet, and the last IP packet carries an end maker of the application layer packet. When the DPI module 103 obtains a start marker and an end marker belonging to a same application layer packet, the DPI module 103 may determine that a complete application layer packet is received, and then determine that all user data belonging to the same original data is received.

Figure 3:
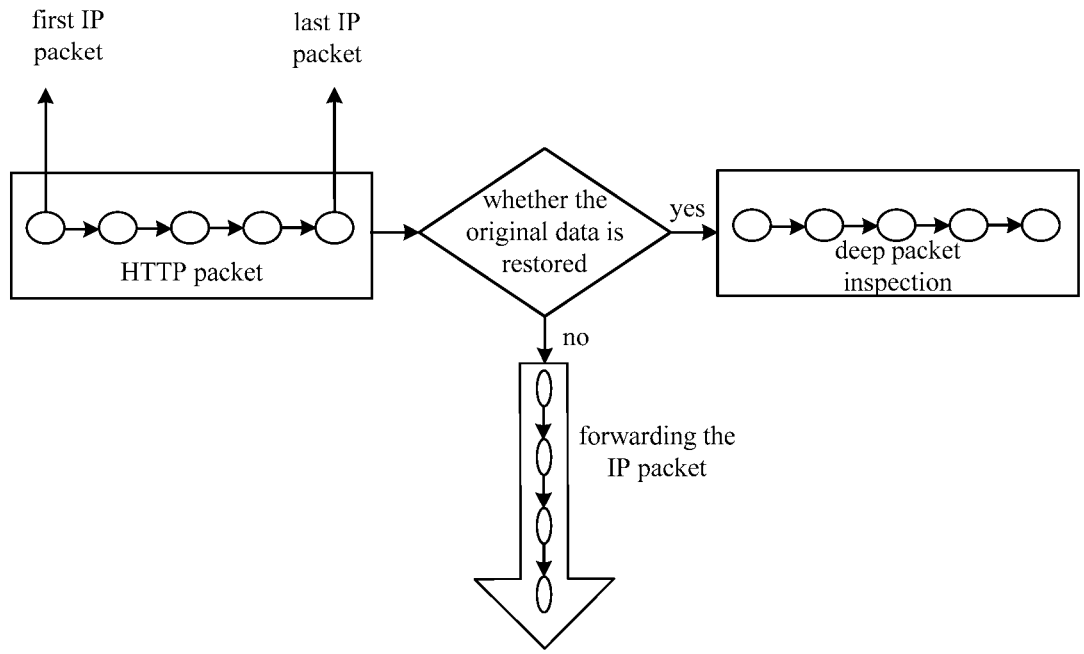
FIG. 3 is a schematic flowchart of processing an HPPT packet according to an example of the disclosure.

For example, FIG. 3 shows the processing of a HTTP packet. An HTTP packet is divided into multiple IP packets. When the DLP device receives the first IP packet, the DPI module 103 extracts the start marker from the first IP packet. It can be appreciated that, during the transmission of the HTTP packet, the device will not send the next IP packet of the HTTP packet until an IP packet of the HTTP packet is allowed to pass and a response packet corresponding to this IP packet is received.

Therefore, the DPI module 103 buffers the user data in the first IP packet and allows the first IP packet to pass. Similarly, before receiving the last IP packet of the HTTP packet, the DLP device buffers user data of received IP packets of the HTTP packet and allows the received IP packets of the HTTP packet to pass. When the DLP device receives the last IP packet of the HTTP packet, the DPI module 103 extracts the end marker from the last IP packet of the HTTP packet. At this time, the DPI module 103 determines that the complete HTTP packet is received, i.e. all user data belonging to the same original data is received. The DPI module 103 obtains a preset security policy, searches for a target matching item that matches with the original data in the security policy, and performs an action indicated by an action item corresponding to the target matching item.

Optionally, in an example of the disclosure, the security policy includes two types of action items, i.e., an action item indicating allowing a packet to pass and an action item indicating blocking a packet.

In an implementation, when the action item corresponding to the target matching item indicates allowing a packet to pass, the DPI module 103 sends a third message to the proxy module 102. The third message indicates allowing the IP packet to pass, and the third message contains a first storage location of the first user data.

After receiving the third message, the proxy module 102 determines to allow the IP packet to pass, and searches for the first user data according to the first storage location. The proxy module 102 encapsulates the first user data according to the TCP port information for the second TCP connection to obtain second user data. The second user data includes a TCP header and the first user data. The proxy module 102 sends a fourth message to the forwarding module 101. The fourth message indicates allowing the IP packet to pass, and the fourth message includes a second storage location of the second user data.

After receiving the fourth message, the forwarding module 101 determines to allow the IP packet to pass, and searches for the second user data according to the second storage location. The forwarding module 101 encapsulates the second user data to obtain an IP packet, and sends the IP packet to the server. It can be appreciated that the IP packet obtained by encapsulating the second user data by the forwarding module 101 is the same as the IP packet received by the network card 104.

In another implementation, when the action item corresponding to the target matching item indicates blocking a packet, the DPI module 103 sends a fifth message to the proxy module 102. The fifth message indicates blocking the IP packet, and the fifth message includes the first storage location of the first user data and first blocking data. The first blocking data may be a string preset by the DLP device.

After receiving the fifth message, the proxy module 102 searches for the first user data according to the first storage location, and releases the first user data. In addition, the proxy module 102 encapsulates the first blocking data according to the TCP port information for the first TCP connection to obtain second blocking data. The second blocking data includes a TCP header and the first blocking data. The proxy module 102 sends the second blocking data to the forwarding module 101.

After receiving the second blocking data, the forwarding module 101 encapsulates the second blocking data to obtain a blocking packet. The forwarding module 101 in the server's stead to send the blocking packet to the user device. In an example, the blocking packet may be a blocking packet containing "403 Forbidden". The "403 Forbidden" may be understood as the first blocking data.

After receiving the blocking packet, the user device may determine that the access fails and there are errors in accessing data.

As a non-restrictive example, the third message and the fifth message may be a value as returned by a function. The value is a result negotiated by the DPI module 103 and the proxy module 102 in advance. For example, the value may be "3" that indicates allowing a packet to pass, or "4" that indicates blocking a packet. If the DPI module 103 determines that the action item corresponding to the target matching item indicates allowing a packet to pass, it sends a value of 3 to the proxy module 102. If the DPI module 103 determines that the action item corresponding to the target matching item indicates blocking a packet, it sends a value of 4 to the proxy module 102.

The function may be, but not limited to, a function of Fun ( ) get ( ) function, and the like. In the example of the disclosure, for illustration purpose, 3 is used to indicate allowing a packet to pass, and 4 is used to indicate blocking a packet, which is not limited. For example, it is also possible to use "1" to indicate allowing a packet to pass, and "0" to indicate blocking a packet.

Similarly, the fourth message may be a value as returned by a function. The value is a result negotiated by the forwarding module 101 and the proxy module 102 in advance. For example, the value may be "3" that indicates allowing a packet to pass, or "4" that indicates blocking a packet. If the third message is received, the proxy module 102 sends a function value 3 to the forwarding module 101. If the fifth message is received, the proxy module 102 sends a value of 4 to the forwarding module 101.

The function may be, but not limited to, a function of Fun ( ) function, get ( ) or the like. In the example of the disclosure, for illustration purpose, 3 is used to indicate allowing a packet to pass, and 4 to indicate blocking a packet, which is not limited. For example, it is also possible to use "1" to indicate allowing a packet to pass, and "0" to indicate blocking a packet.

Optionally, in an example of the disclosure, the DPI module 103 is further to send a sixth message to the proxy module 102 when the application layer protocol for transmitting the IP packet is not listened to, thereby implementing a fast forwarding of the IP packet.

Specifically, when the application layer protocol for transmitting the IP packet is not listened to, the DPI module 103 sends the sixth message to the proxy module 102. The sixth message indicates that the application layer protocol for transmitting the IP packet is not listened to.

The proxy module 102 receives the sixth message and sends it to the forwarding module 101. After receiving the sixth message, the forwarding module 101 determines that the application layer protocol for transmitting the IP packet is not listened to according to the sixth message, reads the IP packet from the user-mode buffer, and sends the IP packet to the server. At this time, the DPI module 103 does not perform deep packet inspection on the IP packet, which improves the efficiency of forwarding the IP packet.

As a non-restrictive example, the sixth message may be a value as returned by a function. The value is specifically a result negotiated by the DPI module 103 and the proxy module 102 in advance. For example, the value may be "0" that indicates being monitored, and "1" that indicates not being monitored. If the DPI module 103 determines that the application layer protocol for transmitting the IP packet is listened to, it sends a value of 1 to the proxy module 102.

Figure 4:
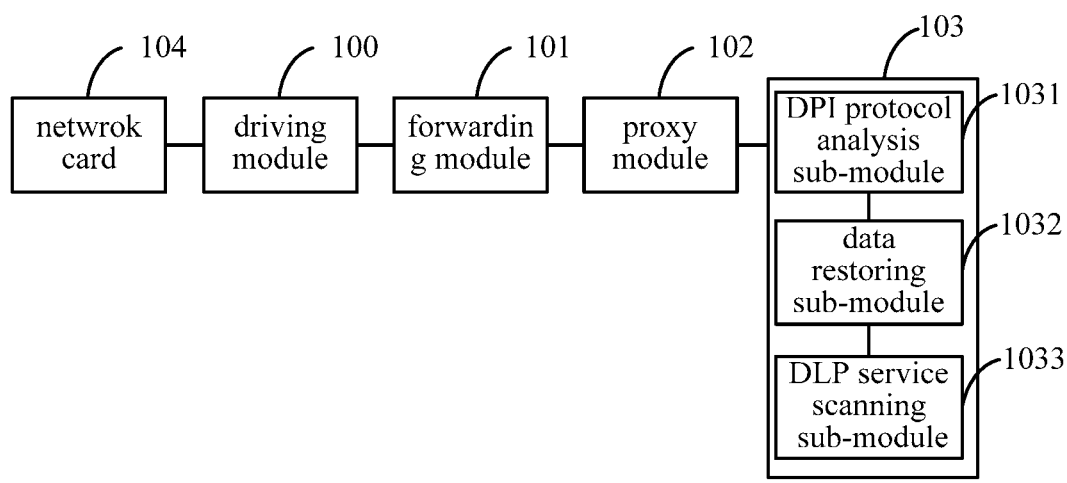
FIG. 4 is a schematic structural diagram of another DLP device according to an example of the disclosure.
Figure 5:
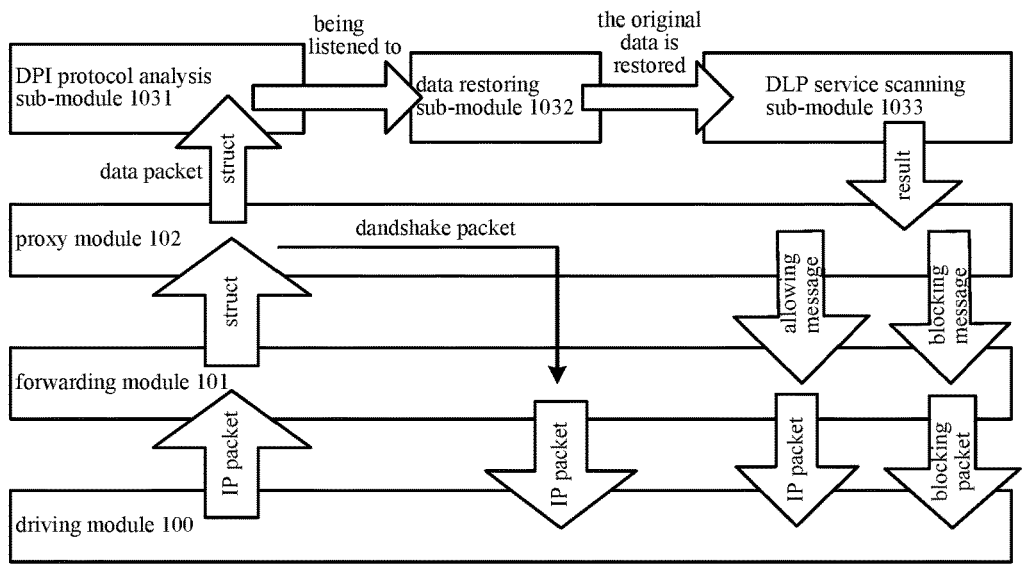
FIG. 5 is a schematic flowchart of processing an IP packet according to an example of the disclosure.

Optionally, in an example of the disclosure, as shown in FIG. 4, the DPI module 103 may include a DPI protocol analysis sub-module 1031, a data restoring sub-module 1032, and a DLP service scanning sub-module 1033. Based on the DLP device shown in FIG. 4, the processing of an IP packet is as shown in FIG. 5.

Specifically, the driving module 100 receives an IP packet and buffers the IP packet into a user-mode buffer.

The forwarding module 101 reads the IP packet from the user-mode buffer, generates a struct corresponding to the IP packet, and sends the struct to the proxy module 102.

The proxy module 102 receives the struct, obtains TCP port information according to the struct; and detects whether a first TCP connection is established between the DLP device and the user device according to the TCP port information; and if the first TCP connection is not established, when the IP packet is a data packet, sends the struct to the DPI protocol analysis sub-module 1031.

The DPI protocol analysis sub-module 1031 receives the struct sent by the proxy module 102. The storage location of the IP packet is determined according to the struct, and the IP packet is found according to the storage location. Based on the conventional application layer protocol identification, the DPI protocol analysis sub-module 1031 performs protocol identification on the IP packet and determines an application layer protocol for transmitting the IP packet. The DPI protocol analysis sub-module 1031 determines whether the application layer protocol for transmitting the IP packet is listened to. If the application layer protocol for transmitting the IP packet is listened to, the DPI protocol analysis sub-module 1031 analyzes the IP packet and marks a location of first user data included in the IP packet, and sends the marked location of the first user data to the data restoring sub-module 1032.

The data restoring sub-module 1032 decapsulates the IP packet, and obtains and buffers the first user data corresponding to the marked location. The data restoring sub-module 1032 determines whether all user data belonging to a same original data is received. If all user data belonging to the same original data is not received, the data restoring sub-module 1032 buffers the first user data. If all user data belonging to the same original data has been received, the data restoring sub-module 1032 calls a port registered by the DLP service scanning sub-module 1033, and sends a scan message to the DLP service scanning sub-module 1033. The scan message includes a first storage location of the first user data.

After receiving the scan message, the DLP service scanning sub-module 1033 obtains the first user data according to the first storage location. The DLP service scanning sub-module 1033 obtains a preset security policy, searches for a target matching item that matches with the first user data in the security policy, and sends a corresponding message to the proxy module 102 according to an action item corresponding to the target matching item.

For example, when the action item corresponding to the target matching item indicates allowing a packet to pass, the DLP service scanning sub-module 1033 sends a third message to the proxy module 102. When the action item corresponding to the target matching item indicates blocking a packet, the DLP service scanning sub-module 1033 sends a fifth message to the proxy module 102.

Optionally, in an example of the disclosure, after finding the target matching item that matches the first user data, the DLP service scanning sub-module 1033 sends the action item corresponding to the target matching item to the DPI protocol analysis sub-module 1031. The DPI protocol analysis sub-module 1031 sends a corresponding message to the proxy module 102.

For example, when the action item corresponding to the target matching item indicates allowing a packet to pass, the DLP protocol analysis sub-module 1031 sends a third message to the proxy module 102. When the action item corresponding to the target matching item indicates blocking a packet, the DLP protocol analysis sub-module 1031 sends a fifth message to the proxy module 102.

If the proxy module 102 receives a third message, it searches for the first user data according to the first storage location of the first user data; encapsulates the first user data according to the TCP port information for the second TCP connection to obtain second user data, wherein the second user data includes a TCP header and the first user data; and sends a fourth message to the forwarding module 101. The forwarding module 101 receives the fourth message; searches for the second user data according to the second storage location of the second user data; encapsulates the second user data to obtain an IP packet, and sends the IP packet to the server.

If the proxy module 102 receives a fifth message, it releases the first user data according to the first storage location of the first user data; encapsulates the first blocking data according to the TCP port information for the first TCP connection to obtain second blocking data, wherein the second blocking data includes a TCP header and the first blocking data; and sends the second blocking data to the forwarding module 101. The forwarding module 101 receives the second blocking data, encapsulates the second blocking data to obtain a blocking packet, and sends the blocking packet to the user device.

If the proxy module 102 detects that the first TCP connection is not established between the DLP device and the user device, it sends a second message to the forwarding module 101 when the IP packet is a handshake packet.

The forwarding module 101 receives the second message, and sends the IP packet to the server according to the second message.

If the DPI protocol analysis sub-module 1031 determines that the application layer protocol for transmitting the IP packet is not listened to, it sends a sixth message to the proxy module 102.

The proxy module 102 receives the sixth message and sends it to the forwarding module 101.

The forwarding module 101 receives the sixth message, and sends the IP packet to the server according to the sixth message.

Figure 6:
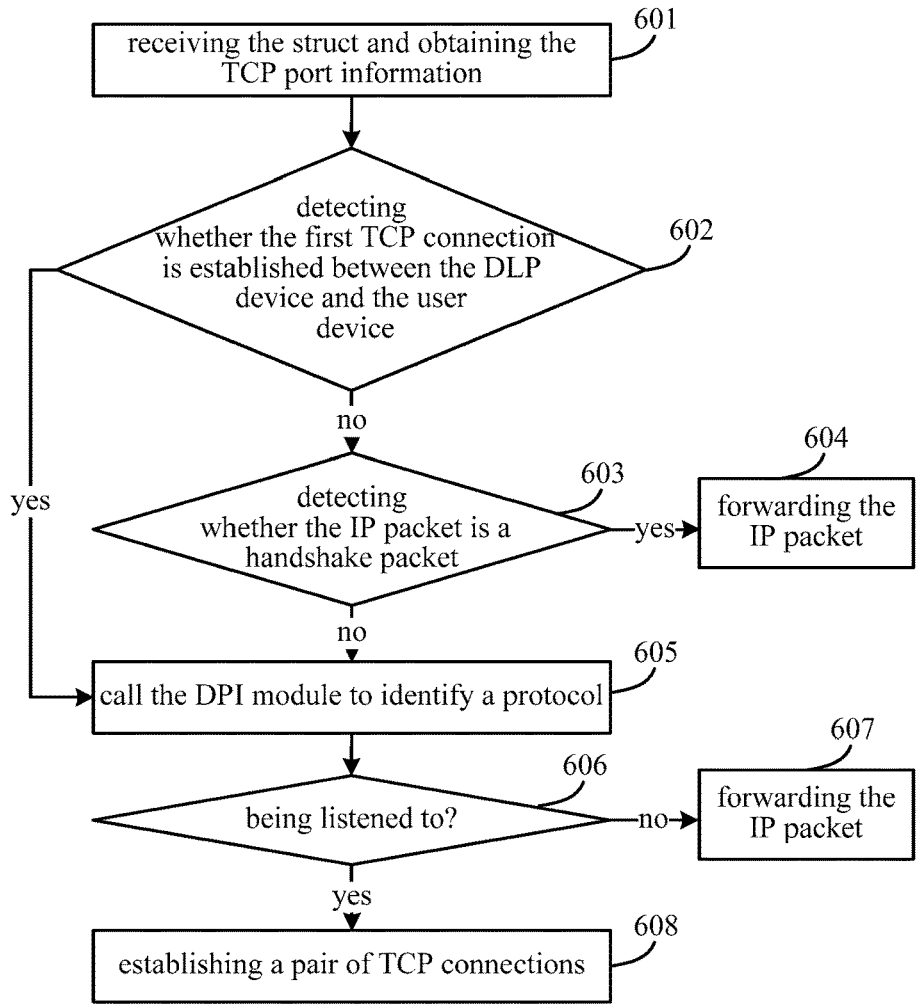
FIG. 6 is a schematic flowchart of processing a packet by a proxy module according to an example of the disclosure.

For ease of understanding, the processing of the proxy module 102 is explained and described with reference to a schematic flowchart of processing of a packet by the proxy module 102 shown in FIG. 6.

At block 601, the proxy module 102 receives the struct sent by the forwarding module 101, and obtains TCP port information according to the struct.

At block 602, the proxy module 102 detects whether the first TCP connection is established between the DLP device and the user device according to the TCP port information. If the first TCP connection is not established, block 603 is performed. If the first TCP connection is established, block 605 is performed.

At block 603, the proxy module 102 detects whether the IP packet is a handshake packet. If the IP packet is a handshake packet, block 604 is performed. If the IP packet is not a handshake packet, that is, the IP packet is a data packet, block 605 is performed.

At block 604, the proxy module 102 sends the second message to the forwarding module 101.

After receiving the second message, the forwarding module 101 sends the IP packet to the server according to the second message.

At block 605, the proxy module 102 sends the struct to the DPI module 103.

The DPI module 103 obtains a packet feature of the IP packet according to the struct. The DPI module 103 determines an application layer protocol for transmitting the IP packet by comparing the packet feature of the IP packet with packet features corresponding to respective application layer protocols. When the application layer protocol for transmitting the IP packet is listened to, the DPI module 103 sends the first message to the proxy module 102. When the application layer protocol for transmitting the IP packet is not listened to, the DPI module 103 sends the sixth message to the proxy module 102.

At block 606, if the sixth message is received, the proxy module 102 determines that the application layer protocol for transmitting the IP packet is not listened to, and block 607 is performed. If the first message is received, it is determined that the application layer protocol for transmitting the IP packet is listened to, and block 608 is performed.

At block 607, the proxy module 102 sends the sixth message to the forwarding module 101.

After receiving the sixth message, the forwarding module 101 sends the IP packet to the server according to the sixth message.

At block 608, the proxy module 102 establishes a pair of TCP connections according to the TCP port information, wherein the pair of TCP connections includes the first TCP connection and the second TCP connection.

A brief description is given to the above blocks 601-608, and specific details can be referred to the related description of FIGS. 1-5.

Figure 7:
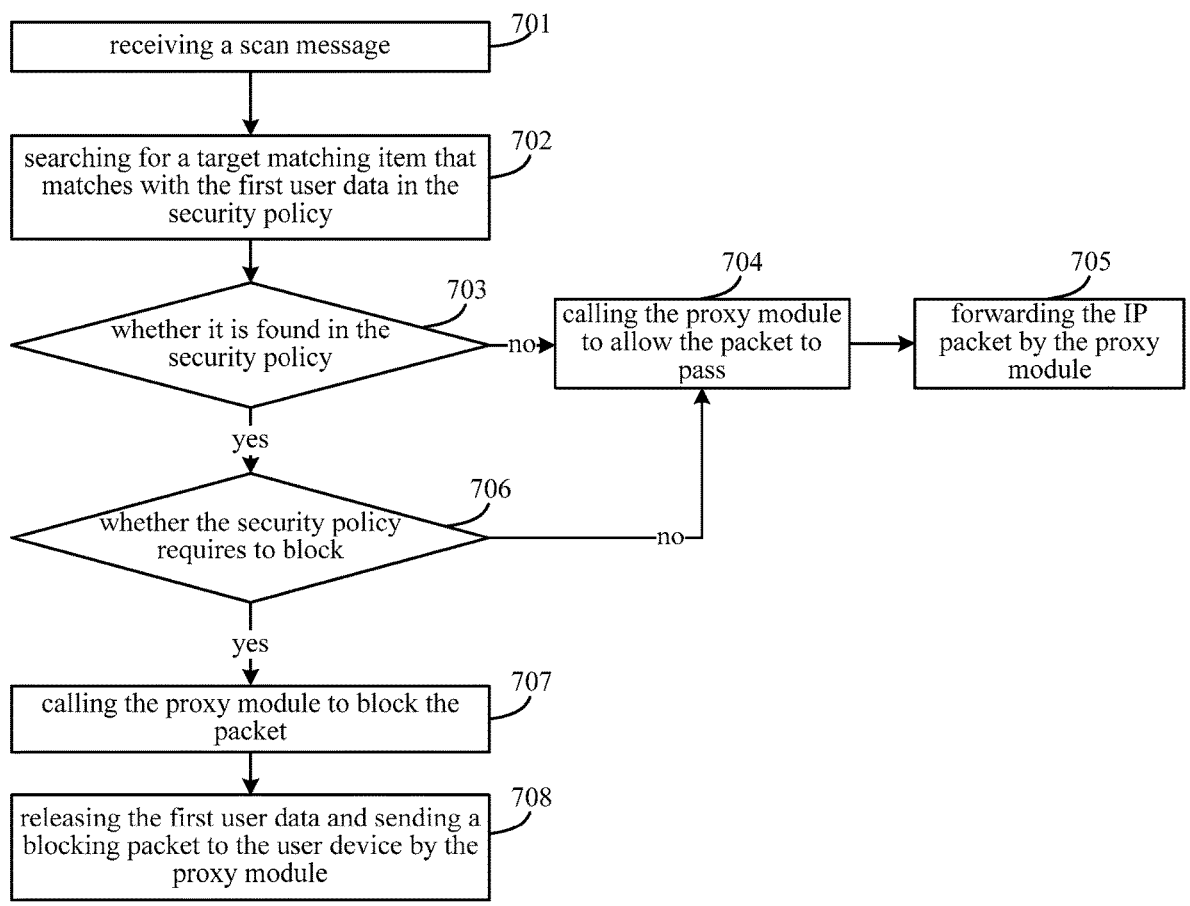
FIG. 7 is a schematic flowchart of processing a packet by a DLP service scanning sub-module and the proxy module according to an example of the disclosure.

For ease of understanding, the flow of processing a packet is explained and described with reference to a schematic flowchart of processing a packet performed by the DLP service scanning sub-module 1033 and the proxy module 102 shown in FIG. 7.

At block 701, the DLP service scanning sub-module 1033 receives the scan message sent by the data restoring sub-module 1032.

At block 702, the DLP service scanning sub-module 1033 obtains a preset security policy according to the scan message, and searches for a target matching item that matches with the first user data in the security policy.

At block 703, if the DLP service scanning sub-module 1033 does not find the target matching item, block 704 is performed. If the target matching item is found, block 706 is performed.

At block 704, the DLP service scanning sub-module 1033 calls the proxy module 102, and sends the third message to the proxy module 102.

At block 705, the proxy module 102 searches for the first user data, encapsulates the first user data according to the TCP port information for the second TCP connection to obtain second user data, and sends the fourth message to the forwarding module 101.

At block 706, if the DLP service scanning sub-module 1033 determines that the action item corresponding to the target matching item indicates allowing a packet to pass, block 704 is performed. If the DLP service scanning sub-module 1033 determines that the action item corresponding to the target matching item indicates blocking a packet, block 707 is performed.

At block 707, the DLP service scanning sub-module 1033 calls the proxy module 102, and sends the fifth message to the proxy module 102.

At block 708, the proxy module 102 releases the first user data, encapsulates the first blocking data according to the TCP port information for the first TCP connection to obtain second blocking data, and sends the second blocking data to the forwarding module 101.

A brief description is given to the above blocks 701~708, and specific details can be referred to the related description of FIGS. 1-5.

Optionally, in an example of the disclosure, the proxy module 102 may be further to establish an SSL protocol connection when the IP packet is an packet encrypted by using SSL protocol. By establishing the SSL protocol connection, user data contained in the packet encrypted by SSL protocol can be decrypted to obtain user data in plain text, thereby implementing data leakage prevention.

Specifically, if the IP packet is a packet encrypted based on SSL protocol, the proxy module 102 calls a first interface and a second interface of the OpenSSL cryptogram library respectively. The proxy module 102 binds the called first interface to the first TCP connection, and binds the called second interface to the second TCP connection, thereby completing the establishment of the SSL protocol connection.

After receiving the struct corresponding to the IP packet, the proxy module 102 determines the storage location of the IP packet according to the struct, and finds the IP packet according to the storage location. The proxy module 102 calls the OpenSSL cryptogram library based on the first interface bound to the first TCP connection, and decrypts the user data contained in the IP packet to obtain the user data in plain text. The proxy module 102 sends the storage location of the user data in plain text to the DPI module 103.

After receiving the third message sent by the DPI module 103, the proxy module 102 calls the OpenSSL cryptogram library based on the second interface bound to the second TCP connection, encrypts the user data contained in the IP packet to obtain encrypted user data, and encapsulates the encrypted user data.

If the IP packet received by the proxy module 102 is a plaintext packet, such as an HTTP packet, an SMTP packet, or an FTP packet, the proxy module 102 may not process the IP packet.

Figure 8:
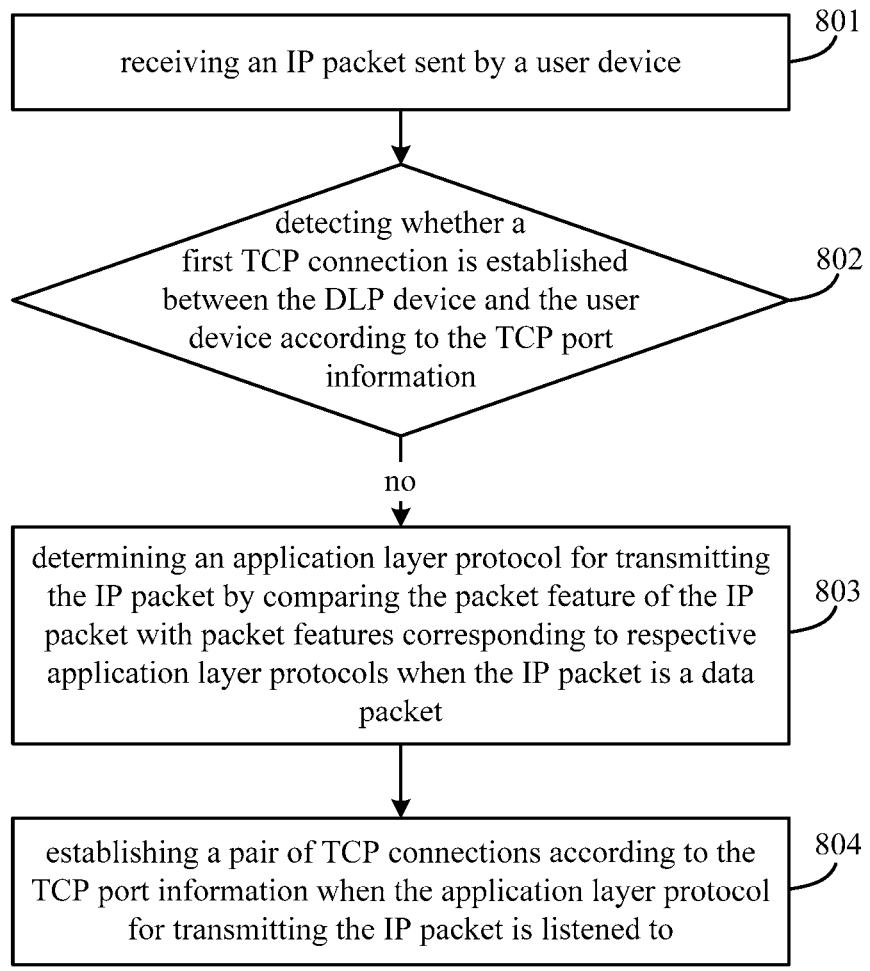
FIG. 8 is a schematic flowchart of a method for processing a packet according to an example of the disclosure.

Based on the examples of the DLP device provided above, an example of the disclosure further provides a method for processing a packet. Referring to FIG. 8, FIG. 8 is a schematic flowchart of the method for processing a packet according to the example of the disclosure. The method is applicable to a DLP device, and the method for processing a packet includes following blocks.

At block 801, an IP packet sent by a user device is received.

The IP packet includes information such as an IP header and a TCP header, wherein the TCP header includes TCP port information. The IP packet may be a protocol packet or a data packet.

The DLP device is arranged between the user device and a server. The user device sends IP packets to the server through the DLP device.

At block 802, it is detected whether a first TCP connection is established between the DLP device and the user device according to the TCP port information. If the first TCP connection is not established, block 803 is performed by the DLP device.

After receiving the IP packet, the DLP device obtains the TCP port information included in the IP packet. The DLP device detects whether the first TCP connection is established between the DLP device and the user device according to the obtained TCP port information. If the first TCP connection is not established, block 803 is performed by the DLP device.

At block 803, if the IP packet is a data packet, an application layer protocol for transmitting the IP packet is determined by comparing a packet feature of the IP packet with packet features corresponding to respective application layer protocols.

If the DLP device detects that the first TCP connection is not established, it detects the type of the IP packet, that is, detects whether the IP packet is a protocol packet or a data packet. In an example of the disclosure, the protocol packet may specifically be a handshake packet, and the following examples are described by taking a handshake packet as an example. If it is detected that the IP packet is a data packet, the DLP device determines the application layer protocol for transmitting the IP packet by comparing the packet feature of the IP packet with packet features corresponding to respective application layer protocols.

At block 804, when the application layer protocol for transmitting the IP packet is listened to, a pair of TCP connections is established according to the TCP port information, wherein the pair of TCP connections includes the first TCP connection and a second TCP connection between the DLP device and the server.

When the application layer protocol for transmitting the IP packet is listened to, the DLP device establishes the first TCP connection with the user device according to the TCP port information. The DLP device establishes the second TCP connection with the server according to the TCP port information. The DLP device subsequently transmits IP packets through the first TCP connection and the second TCP connection, the TCP port information included in the IP packet will not change, which reduces the risk that the server finds that the IP packet is under proxy.

Optionally, in an example of the disclosure, when the IP packet is a protocol packet, such as a handshake packet, the DLP device allows the IP packet to pass, that is, sends the IP packet to the server. The server establishes a TCP connection with the user device according to the IP packet. In this way, the number of packets processed by the DLP device is reduced, and thus the burden on the DLP device is reduced. In addition, the user device directly establishes the TCP connection with the server, which reduces the risk that the server finds that IP packets are under proxy.

Optionally, in an example of the disclosure, if the DLP device detects that the first TCP connection is established, it determines an application layer protocol for transmitting the IP packet by comparing the packet feature of the IP packet with packet features corresponding to respective application layer protocols. The DLP device does not need to detect the type of the IP packet, which reduces the burden on the DLP device.

Optionally, in an example of the disclosure, when the application layer protocol for transmitting the IP packet is not listened to, the DLP device allows the IP packet to pass, that is, sends the IP packet to the server. The DLP device does not process the IP packet, which reduces the burden on the DLP device.

Optionally, in an example of the disclosure, when the IP packet is a data packet, the DLP device may also mark the location of the first user data contained in the IP packet, decapsulates the IP packet, and obtains and buffers the first user data corresponding to the marked location. The DLP device obtains a preset security policy. The security policy includes matching items and action items. The DLP device searches for a target matching item that matches with the first user data in the security policy, and performs an action indicated by an action item corresponding to the target matching item.

The action items include an action item indicating allowing a packet to pass, and an action item indicating blocking a packet. In an example, when the action item corresponding to the target matching item indicates allowing a packet to pass, the DLP device encapsulates the first user data according to the TCP port information for the second TCP connection to obtain an IP packet, and sends the IP packet to the server.

Specifically, when the action item corresponding to the target matching item indicates allowing a packet to pass, the DLP device encapsulates the first user data according to the TCP port information for the second TCP connection to obtain the second user data, wherein the second user data includes a TCP header and the first user data. After that, the DLP device encapsulates the second user data to obtain an IP packet, and sends the IP packet to the server.

In another example, when the action item corresponding to the target matching item indicates blocking a packet, the DLP device generates a blocking packet according to the TCP port information for the first TCP connection. The DLP device sends, in the server's stead, the blocking packet to the user device, which improves the network security.

Optionally, in an example of the disclosure, if the IP packet is a packet encrypted by using the SSL protocol, in order to accurately perform data leakage prevention processing on user data, the DLP device calls the first interface and the second interface of the OpenSSL cryptogram library respectively, binds the called first interface to the first TCP connection, and binds the called second interface to the second TCP connection. In this way, the DLP device can complete SSL encryption and decryption of user data, and thus can obtain user data in plain text, and correctly perform data leakage prevention processing on user data.

In the technical solutions according to the examples of the disclosure, when the DLP device determines that the application layer protocol for transmitting the IP packet is listened to, based on the TCP port information included in the IP packet, the first TCP connection between the DLP device and the user device is established, and the second TCP connection between the DLP device and the server is established, and then the data leakage prevention for the user device is implemented according to the first TCP connection and the second TCP connection. It can be seen that, in the examples of the disclosure, in the process of implementing data leakage prevention, the DLP device can listen to any TCP ports. In addition, the DLP device does not need to set additional bridges and firewall rules, and solves the problem that a user cannot access to the network due to bridge failures or even kernel crashes.

It should be noted that the relationship terms used herein such as "first", "second", and the like are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a . . . " or "include(s) a . . . " do not exclude that there are other identical elements in the processes, methods, articles, or devices which include these elements.

All the examples are described in corresponding ways, same or similar parts in each of the examples can be referred to one another, and the parts emphasized are differences to other examples. In particular, the method example is described briefly since it is substantially similar to the DLP device example, and the related parts can be referred to the corresponding description of the DLP device example.

The above are only preferable examples of the disclosure, and are not intended to limit the protection scope of the disclosure. Any modifications, alternatives, improvements, or the like within the spirit and principle of the disclosure shall be included within the protection scope of the disclosure.

The invention claimed is:

1. A Data Leakage Prevention (DLP) device, wherein the DLP device comprises a network card, a driving module, a forwarding module, a proxy module and a Deep Packet Inspection (DPI) module, wherein the driving module, the forwarding module, the proxy module and the DPI module are modules implemented by executing a software program by a Central Processing Unit, wherein:

the network card is to receive an Internet Protocol (IP) packet sent by a user device, and send the IP packet to a driving module, wherein the IP packet comprises Transmission Control Protocol (TCP) port information;

the driving module is to receive the IP packet and buffer the IP packet into a user-mode buffer;

the forwarding module is to read the IP packet from the user-mode buffer, generate a struct corresponding to the IP packet, and send the struct to a proxy module;

the proxy module is to receive the struct; obtain the TCP port information according to the struct; and detect whether a first TCP connection is established between the DLP device and the user device according to the TCP port information; and when the first TCP connection is not established and when the IP packet is a data packet, send the struct to the DPI module; and the DPI module is to receive the struct; obtain a packet feature of the IP packet according to the struct; determine an application layer protocol for transmitting the IP packet by comparing the packet feature of the IP packet with packet features corresponding to respective application layer protocols; and send a first message to the proxy module when the application layer protocol for transmitting the IP packet is listened to;

wherein the proxy module is further to establish a pair of TCP connections according to the TCP port information after receiving the first message, wherein the pair of TCP connections comprises the first TCP connection and a second TCP connection between the DLP device and a server, wherein the DPI module is further to:
  mark a location of first user data comprised in the IP packet;
  decapsulate the IP packet, and obtain and cache the first user data corresponding to the marked location;
  obtain a preset security policy, wherein the security policy comprises matching items and action items; and
  search for a target matching item that matches the first user data in the security policy, and perform an action indicated by an action item corresponding to the target matching item, wherein the proxy module is further to send a second message to the forwarding module when the IP packet is a protocol packet; and
  the forwarding module is further to receive the second message; and send the IP packet to the server according to the second message, to cause the server to establish a TCP connection with the user device according to the IP packet.

2. The DLP device of claim 1, wherein the DPI module is specifically to:
  send a third message to the proxy module when the action item corresponding to the target matching item indicates allowing a packet to pass, wherein the third message comprises a first storage location of the first user data;
  wherein the proxy module is further to:
    receive the third message;
    search for the first user data according to the first storage location;
    encapsulate the first user data according to TCP port information for the second TCP connection to obtain second user data, wherein the second user data comprises a TCP header and the first user data; and
    send a fourth message to the forwarding module, wherein the fourth message comprises a second storage location of the second user data; and
  wherein the forwarding module is further to receive the fourth message; search for the second user data according to the second storage location; encapsulate the second user data to obtain the IP packet; and send the IP packet to the server.

3. The DLP device of claim 1, wherein the DPI module is specifically to:
  send a fifth message to the proxy module when the action item corresponding to the target matching item indicates blocking a packet, wherein the fifth message comprises a first storage location of the first user data and first blocking data;
  wherein the proxy module is further to receive the fifth message; release the first user data from the first storage location; encapsulate the first blocking data according to TCP port information for the first TCP connection to obtain second blocking data, wherein the second blocking data comprises a TCP header and the first blocking data; and send the second blocking data to the forwarding module; and
  wherein the forwarding module is further to receive the second blocking data; encapsulate the second blocking data to obtain a blocking packet; and send the blocking packet to the user device.

4. The DLP device of claim 1, wherein the DPI module is specifically to:
  determine whether all user data belonging to a same original data is received; and
  obtain the preset security policy when all user data belonging to the same original data is received.

5. The DLP device of claim 1, wherein the DPI module is further to:
  send a sixth message to the proxy module when the application layer protocol for transmitting the IP packet is not listened to;
  wherein the proxy module is further to receive the sixth message and send the sixth message to the forwarding module; and
  wherein the forwarding module is further to receive the sixth message and send the IP packet to the server according to the sixth message.

6. The DLP device of claim 1, wherein the proxy module is further to:
  call a first interface and a second interface of an Open Secure Sockets Layer (OpenSSL) cryptogram library respectively when the IP packet is a packet encrypted using a Secure Sockets Layer (SSL) protocol; and
  bind the called first interface to the first TCP connection, and bind the called second interface to the second TCP connection.

7. A method for processing a packet, applicable to a Data Leakage Prevention (DLP) device, comprising:
  receiving an Internet Protocol (IP) packet sent by a user device, wherein the IP packet comprises Transmission Control Protocol (TCP) port information;
  detecting whether a first TCP connection is established between the DLP device and the user device according to the TCP port information;
  when the first TCP connection is not established and when the IP packet is a data packet, determining an application layer protocol for transmitting the IP packet by comparing a packet feature of the IP packet with packet features corresponding to respective application layer protocols;
  establishing a pair of TCP connections according to the TCP port information when the application layer protocol for transmitting the IP packet is listened to, wherein the pair of TCP connections comprises the first TCP connection and a second TCP connection between the DLP device and a server;
  marking a location of first user data comprised in the IP packet;
  decapsulating the IP packet, and obtaining and caching the first user data corresponding to the marked location;
  obtaining a preset security policy, wherein the security policy comprises matching items and action items;
  searching for a target matching item that matches the first user data in the security policy, and performing an action indicated by an action item corresponding to the target matching item; and sending the IP packet to the server when the IP packet is a protocol packet, to cause the server to establish a TCP connection with the user device according to the IP packet.

8. The method of claim 7, wherein performing an action indicated by an action item corresponding to the target matching item comprises:

when the action item corresponding to the target matching item indicates allowing a packet to pass, encapsulating the first user data according to TCP port information for the second TCP connection to obtain the IP packet; and sending the IP packet to the server.

9. The method of claim 7, wherein performing an action indicated by an action item corresponding to the target matching item comprises:

when the action item corresponding to the target matching item indicates blocking a packet, generating a blocking packet according to TCP port information for the first TCP connection; and sending the blocking packet to the user device.

10. The method of claim 7, wherein obtaining a preset security policy comprises:

determining whether all user data belonging to a same original data is received; and obtaining the preset security policy when all user data belonging to the same original data is received.

11. The method of claim 7, further comprising:

calling a first interface and a second interface of an Open Secure Sockets Layer (OpenSSL) cryptogram library respectively when the IP packet is a packet encrypted using Secure Sockets Layer (SSL) protocol; and binding the called first interface to the first TCP connection, and binding the called second interface to the second TCP connection.

* * * * *